F. GARVER.
GARBANZON THRESHING MACHINE.
APPLICATION FILED MAY 4, 1908.
942,063.
Patented Dec. 7, 1909.
2 SHEETS—SHEET 1.
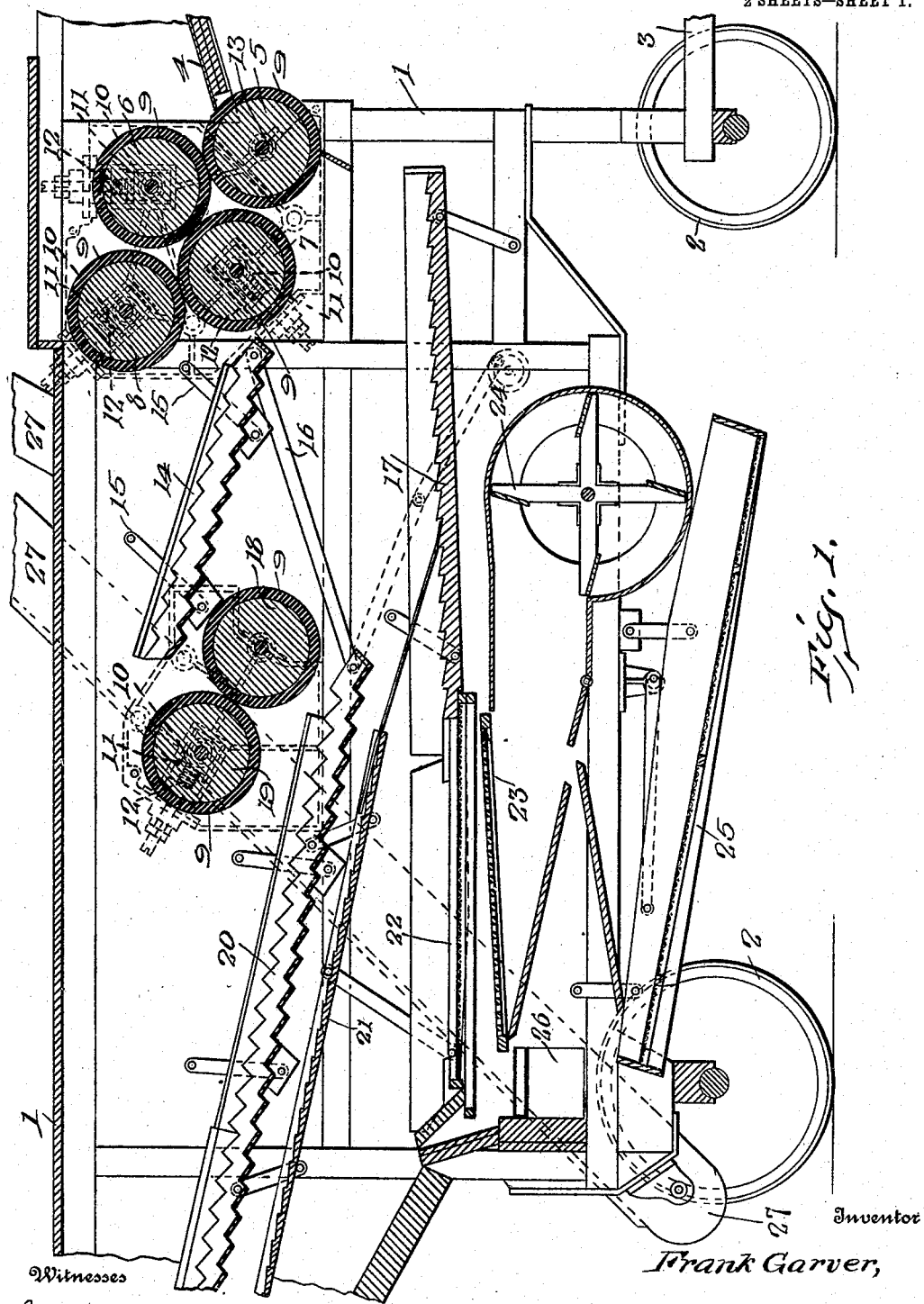
Witnesses
J. Howard Walmsley
Edward F. Reed
Inventor
Frank Garver,
By
Attorney

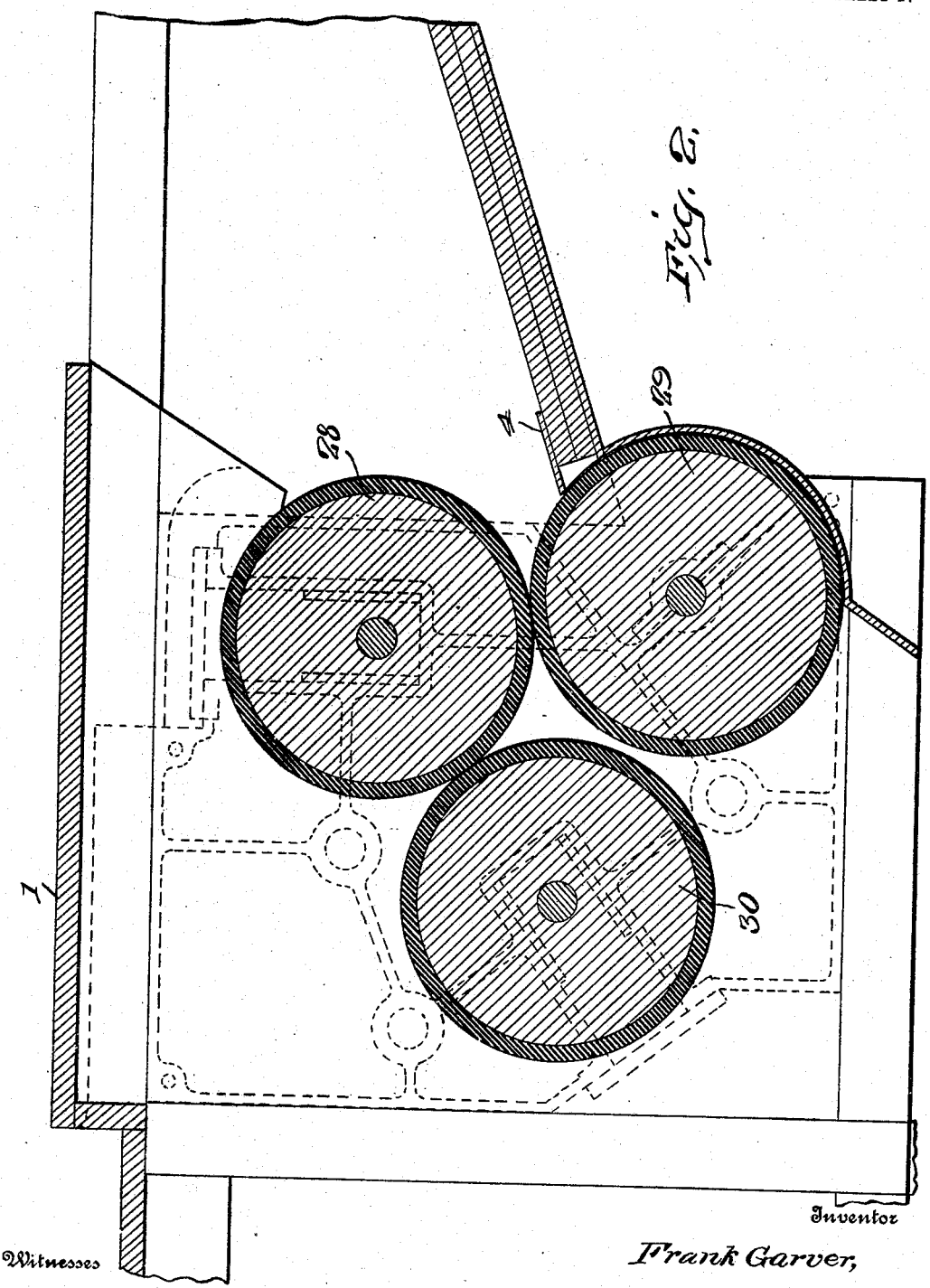

UNITED STATES PATENT OFFICE.

FRANK GARVER, OF MARION, OHIO, ASSIGNOR TO THE HUBER MANUFACTURING COMPANY, OF MARION, OHIO, A CORPORATION OF OHIO.

GARBANZON-THRESHING MACHINE.

942,063.　　　　　Specification of Letters Patent.　　Patented Dec. 7, 1909.

Application filed May 4, 1908. Serial No. 430,713.

*To all whom it may concern:*

Be it known that I, FRANK GARVER, a citizen of the United States, residing at Marion, in the county of Marion and State of Ohio, have invented certain new and useful Improvements in Garbanzon - Threshing Machines, of which the following is a specification, reference being had therein to the accompanying drawings.

This invention relates to garbanzon threshing machines, and the object of the same is to provide a machine of this character which will so treat the garbanzon as to break open the pods or hulls and release the kernels contained therein and then thoroughly separate the kernels from the pods and the vines.

To this end I have provided a machine so constructed as to subject the garbanzon plant and pod to several treatments before it reaches the preliminary separating device, thus thoroughly crushing and breaking open the pods, and, after the plants have passed over the preliminary separating device, they are again treated to break open any pods which may not have been broken in the first treatment, after which they are again subjected to the action of a separating device; and further to provide such a machine which will be so constructed as to employ a minimum number of parts, thus simplifying the construction and reducing the cost of manufacture, and which will have these parts so arranged as to form a compact device which will not materially alter the size or shape of the machine as a whole.

With these objects in view my invention consists in certain novel features of construction and in certain parts and combinations hereinafter to be described, and then more particularly pointed out in the claims.

In the accompanying drawings, Figure 1 is a longitudinal, sectional view taken through a machine embodying my invention; and Fig. 2 is a longitudinal, sectional view taken through a portion of the machine embodying a modified form of the invention.

In the drawings I have illustrated the machine as comprising an outer frame or casing 1 supported upon ground wheels 2 and having suitable draft devices, such as the pole or tongue 3. This outer casing is, in construction and general appearance, quite similar to the ordinary threshing machine and is provided at its forward end with a feed-board 4 which is so arranged as to feed the plants to the treating devices which consist of a plurality of rolls, preferably three or more in number. In the present instance, I have shown four rolls so arranged that each of said rolls is in operative engagement with another of said rolls and two of the four rolls are each in operative engagement with two of the other rolls. It will be understood that the term "operative engagement" or "engagement" as hereinafter used in the specification and claims, does not necessarily mean that the respective rolls are in actual contact one with the other, but rather that these rolls occupy such relative positions that the material passing between the same will be operatively engaged by both of said rolls. In the preferred arrangement of the rolls, the first pair of rolls 5 and 6 are arranged one above the other with their axes in a plane slightly inclined to the vertical, the upper roll being located slightly beyond a vertical plane extending through the axis of the lower roll. These rolls are so arranged as to receive the plants from the feed-board 4 and feed the same into the machine and, at the same time, crush the pods. The second pair of rolls 7 and 8 are preferably arranged with their axes in a plane extending substantially parallel to the planes of the axes of the first pair of rolls 5 and 6 and the second pair of rolls 7 and 8 have their axes located in horizontal planes slightly higher than the horizontal planes of the first pair of rolls 5 and 6, respectively, this difference in the vertical position of the rolls being such as to bring the surface of the roll 7 into contact with the adjacent surface of the roll 6. Thus the roll 6 will be in operative engagement with the rolls 5 and 7 and the roll 7 will be in operative engagement with the rolls 6 and 8. These rolls may be operated in any suitable manner, the operating mechanism not being here shown, but being such as to cause the rolls 5 and 6 to rotate in opposite directions and the rolls 7 and 8 to rotate in opposite directions, this also causing the rolls 6 and 7 to rotate in opposite directions. Thus, it will be seen that at each point of contact between the several rolls, the engaging surfaces are moving in the same direction, that is, inwardly. Consequently, as the material is fed from the feed-board 4 through the first pair of rolls it is engaged by the rolls 6 and 7 and carried between the same and into engagement with the second pair of rolls 7 and 8, thus subjecting the plant and the pods carried thereby to three distinct treatments and serving to crush the pods in such a manner as to break open the same and release the kernels contained therein. In order that the kernels may not be crushed or injured by the rolls I preferably provide the rolls with plain yielding exterior surfaces, which may be readily accomplished by providing the same with a covering of soft rubber, as shown at 9.

One roll of each pair of rolls is preferably movable relatively to the other roll of that pair, thus enabling the rolls to separate sufficiently to permit the passage of quantities of material of varying thicknesses. To this end I have provided each of the rolls 6, 7 and 8 with movable bearings, the bearing 10 of each roll being mounted in a slideway 11 formed in one of the side members of the main frame or casing 1 of the machine in which said bearings are supported. The slideway for the roll 6 is arranged at substantially right angles to the direction of movement of the material as it passes between the rolls 5 and 6, thus permitting the roll 6 to be moved away from the roll 5. A suitable spring 12 is mounted in the upper portion of the slideway 11 in engagement with the bearing 10 and serves to retain the roll 6 normally in engagement with the roll 5. The rolls 7 and 8 are also provided with the sliding bearings of the same character as is the roll 6, the slideway in each instance being arranged at substantially right angles to the direction of movement of the material passing between that particular roll and one of its coöperating rolls. The roll 5 of the first pair is here shown as mounted in stationary bearings 13, as, in the present construction, it is not necessary that this roll should be movable.

Located beyond the initial treating rolls is a suitable separating device which, in the present instance, comprises a rack 14 of well known construction suspended from the sides of the main casing 1 by links 15. A vibratory motion is imparted to this rack in any suitable manner, as by means of a connecting rod 16 and this motion serves to so agitate the plants as to feed the same along the rack and separate therefrom the kernels which have been loosened in their pods, the kernels dropping through the slotted bottom of the rack onto the grain pan 17 and the plants passing from the end of the rack 14 to a secondary treating device comprising a fixed roller 18 and a slidably mounted roller 19 having their adjacent surfaces in operative engagement one with the other and provided with plain yielding surfaces in the same manner as are the rolls of the initial treating devices. The roll 19 is mounted in a slideway similar to that in which the movable rolls of the initial set are mounted and is provided with a spring for retaining the same in engagement with the fixed roll. These rolls operate to crush any parts which may have escaped being broken in the first treatment, to release therefrom the kernel, the pods and kernels both passing from the rolls into a second rack 20 similar to the rack 14 which serves to separate the remaining kernels from the plants and allow the kernels to escape through the slotted bottom thereof onto the return board 21 which conveys the kernels to the grain pan 17, while the rack 20 causes the plants and pods to be deposited at the rear of the machine in the usual manner. The kernels and such portions of the pods as may have adhered thereto or passed through the openings in the racks travel along the grain board 17 to the chaffer board 22 and screen 23 where they are subjected to the action of a blast of air from a blast fan 24, located in the lower portion of the machine, which serves to separate the pods therefrom, the kernels dropping down through the chaffer board and screen onto a suitable separating screen 25. The screen 23 is so arranged that any kernels to which the pods still adhere and which cannot, therefore, pass through the screen will be deposited in a chute 26 which conveys them to an elevator 27, which, in turn, deposits the same upon the preliminary separating rack 14 from which they pass through the second pair of rolls 18 and 19 and are again crushed to break the pods.

While I have herein shown and described the preferred form of separating mechanism, it will be understood that any suitable separating devices may be used and that here shown is employed only for the purpose of illustration, and further, that the details of construction and operation of this separating mechanism which are not here shown, and which form no part of the invention, may be of any ordinary construction.

In Fig. 2 of the drawing I have illustrated a modified form of the initial treating devices in which I have employed but three rolls 28, 29 and 30, these corresponding to the rolls 5, 6 and 7 of the form of the device shown in Fig. 1 and being arranged in substantially the same manner as are those rolls and operating in substantially the same manner, the roll 28 being in engagement with the rolls 29 and 30 and the rolls 28 and 30 being slidably mounted relatively to the rolls 29 and 28, respectively. In this form of the device the operation is exactly the same as that before described, save that the plants are subjected to but two treatments before they are delivered to the preliminary separating devices.

The operation of the device will be readily understood from the foregoing description, and it will be apparent that I have provided a machine for the purpose described which is peculiarly adapted for the treatment of plants such as garbanzon, in which the pods are tough and of a character to resist the action of breaking devices, inasmuch as the present machine is provided with an initial crushing device, by means of which the plants and the pods are subjected to a number of treatments before they are subjected to the preliminary separation, thus serving to thoroughly crush the pods and put the same in such a condition that the kernels can be readily separated therefrom. It will further be apparent that this separating device is so arranged and constructed that the same comprises a minimum number of parts, the three separate treatments of the plants being obtained by the use of three or more rolls, and that these rolls are so arranged as to occupy a minimum amount of space, thus enabling the machine to be manufactured at a low cost and obviating the necessity of the enlargement or rearrangement of the machine to accommodate these crushing devices.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a machine of the character described, a set of rolls comprising three or more rolls, one of said rolls being in operative engagement with two of the other rolls, said rolls being so arranged that both points of engagement lie in the path of the material to be operated upon, a second set of rolls located beyond the first-mentioned set of rolls, and a shaking rack located between said first-mentioned set of rolls and said second set of rolls.

2. In a machine of the character described, a set of rolls comprising three or more rolls and having plain cushioned exterior surfaces, one of said rolls being in operative engagement with two of the other rolls, and said rolls being so arranged that both points of engagement will lie in the path of the material to be operated upon, a second set of rolls located beyond the first-mentioned set of rolls, and a shaking rack interposed between said sets of rolls.

3. In a machine of the character described, a set of rolls comprising four rolls, each of said rolls being in operative engagement with one of the other of said rolls and one of said rolls being in operative engagement with two of the other of said rolls, and said rolls being so arranged that three points of engagement lie in the path of the material to be operated upon.

In testimony whereof, I affix my signature in presence of two witnesses.

FRANK GARVER.

Witnesses:
MILES LONGSHORE,
ED. H. CLARK, Jr.